(12) United States Patent
Timbrell et al.

(10) Patent No.: US 9,923,353 B2
(45) Date of Patent: Mar. 20, 2018

(54) CABLE SUSPENSION

(71) Applicant: PREFORMED LINE PRODUCTS CO., Mayfield Village, OH (US)

(72) Inventors: Philip Timbrell, Mt. Riverview (AU); Nat Allen, Kirribilli (AU); Dan McGonigal, Blaxland (AU); Jason Ryan, Kellyville Ridge (AU)

(73) Assignee: PREFORMED LINE PRODUCTS CO., Mayfield Village, OH (US)

( * ) Notice: Subject to any disclaimer, the term of this patent is extended or adjusted under 35 U.S.C. 154(b) by 0 days.

(21) Appl. No.: 15/457,226

(22) Filed: Mar. 13, 2017

(65) Prior Publication Data

US 2017/0187175 A1 Jun. 29, 2017

Related U.S. Application Data

(63) Continuation of application No. 14/765,624, filed as application No. PCT/US2014/014580 on Feb. 4, 2014, now Pat. No. 9,595,820.

(60) Provisional application No. 61/760,616, filed on Feb. 4, 2013.

(51) Int. Cl.
  *H02G 7/05* (2006.01)

(52) U.S. Cl.
  CPC .................. *H02G 7/053* (2013.01)

(58) Field of Classification Search
  CPC  H02G 7/05; H02G 7/06; H02G 7/053; H02G 7/00; H02G 7/02; F16G 11/00; F16G 11/02; F16L 3/14; F16L 3/00
  USPC .... 174/43, 40 R, 42, 40 CC, 40 TD; 248/63, 248/49, 68.1, 73, 65, 74.1, 74.4, 62, 61; 24/132 R, 135 K
  See application file for complete search history.

(56) References Cited

U.S. PATENT DOCUMENTS

| | | |
|---|---|---|
| 3,155,354 A | 11/1964 | Lindsey |
| 3,261,582 A | 7/1966 | Bethea, Jr. |
| 3,602,956 A | 9/1971 | Eddens |
| 3,916,265 A | 10/1975 | Friedman |
| 3,958,784 A | 5/1976 | Bourrieres |
| 3,979,095 A | 9/1976 | Scholtz |
| 4,884,528 A * | 12/1989 | Steudler, Jr. .............. F16L 3/22 248/62 |
| 6,201,184 B1 | 3/2001 | François et al. |

(Continued)

FOREIGN PATENT DOCUMENTS

| | | |
|---|---|---|
| GB | 2274747 A | 8/1994 |
| WO | 03045728 A1 | 6/2003 |

OTHER PUBLICATIONS

Preliminary Amendment cited in U.S. Appl. No. 14/765,624 dated Aug. 4, 2015, 6 pgs.

(Continued)

*Primary Examiner* — Angel R Estrada
(74) *Attorney, Agent, or Firm* — Cooper Legal Group, LLC

(57) ABSTRACT

A cable suspension may allow a cable to be pivoted about a pivot axis that passes through a thickness of a cable. A bend radius of the cable entering and exiting the cable suspension may be increased and/or the degree of bend by a cable entering and exiting the cable support may be decreased. The cable may comprise insulated electrical cables, non-insulated electrical cables (e.g., conductors), shielded cables, non-electrical signal cables (e.g., optical cables), and/or assemblies thereof.

20 Claims, 10 Drawing Sheets

(56) References Cited

U.S. PATENT DOCUMENTS 6,892,990 B2   5/2005   Pisczak
9,010,695 B2   4/2015   Efraimsson et al.

OTHER PUBLICATIONS

Non-Final Office Action cited in U.S. Appl. No. 14/765,624 dated Aug. 26, 2016, 12 pgs.
Reply Non-Final Office Action cited in U.S. Appl. No. 14/765,624 dated Nov. 28, 2016, 9 pgs.
Notice of Allowance cited in U.S. Appl. No. 14/765,624 dated Dec. 23, 2016, 8 pgs.
Int. Search Report/Written Opinion cited in PCT Application No. PCT/US2014/014580 dated May 21, 2014, 9 pgs.
Preliminary Report cited in PCT Application No. PCT/US2014/014580 dated Aug. 4, 2015, 8 pgs., 9 pgs.
Australian Examination Report cited in Australian Application No. 2014212046 dated Mar. 23, 2017, 3 pgs.
Second Examination Report cited in AU Application No. 2014212046 dated Dec. 15, 2017, 4 pgs.

\* cited by examiner

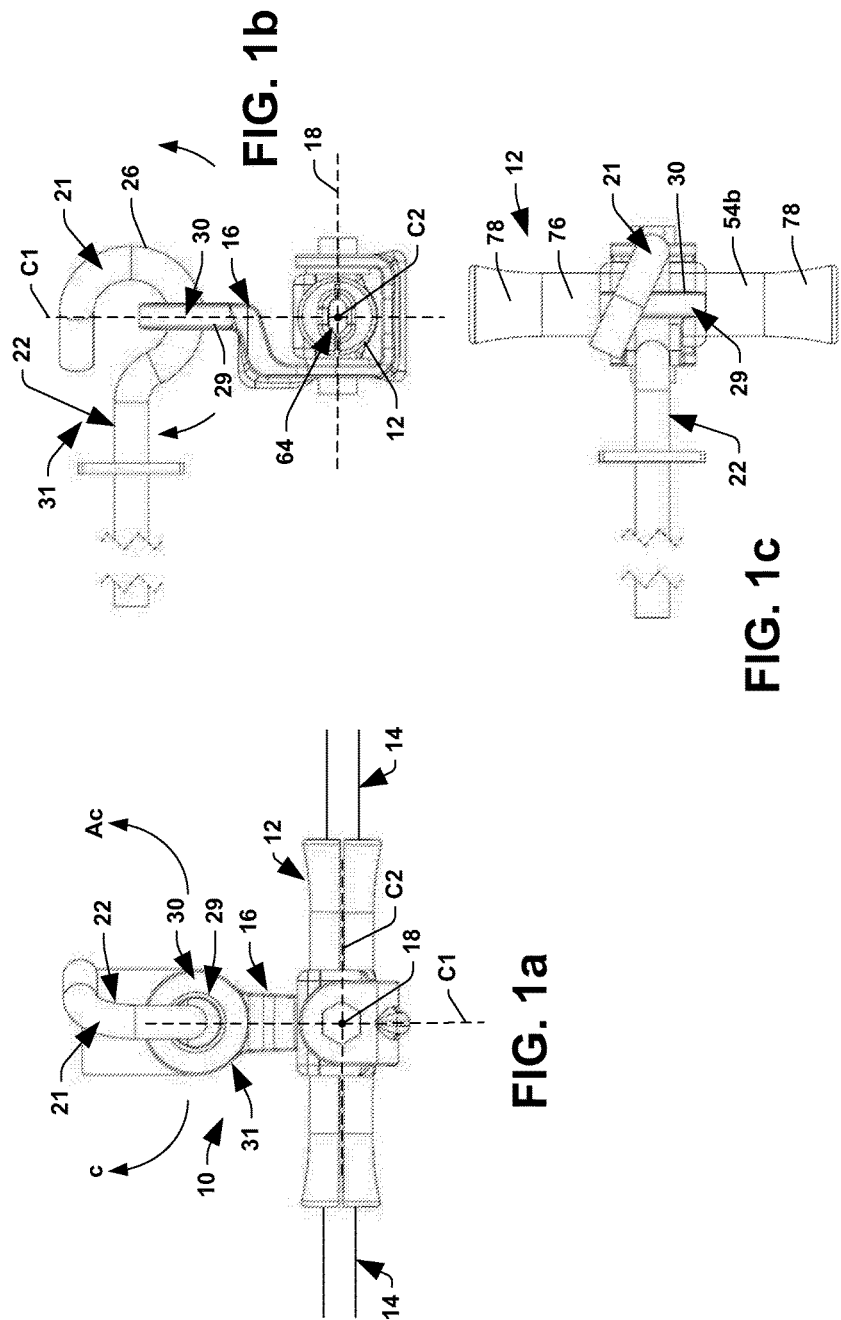

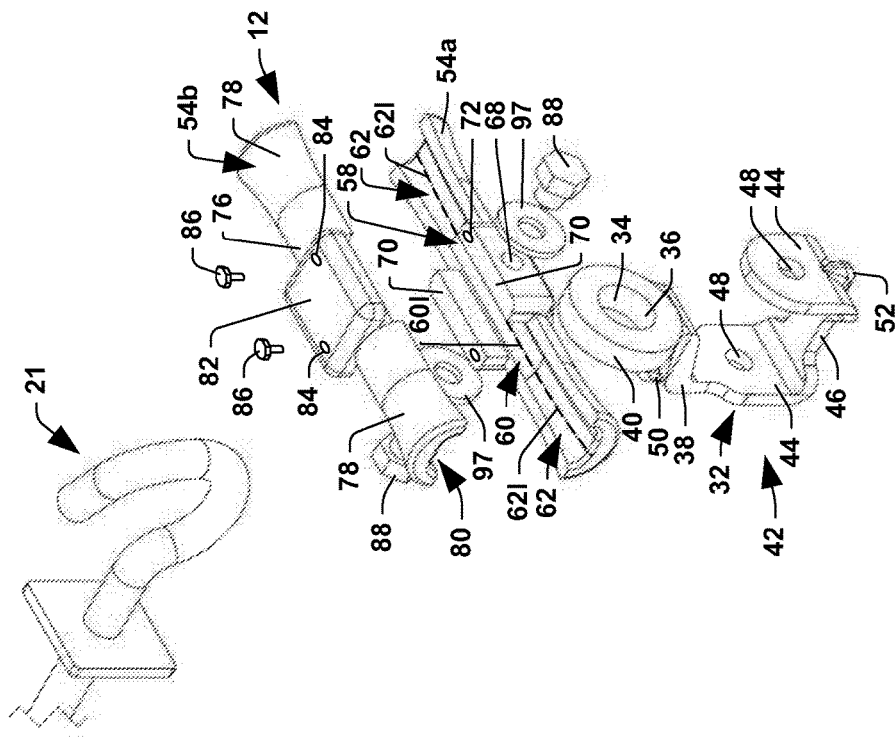
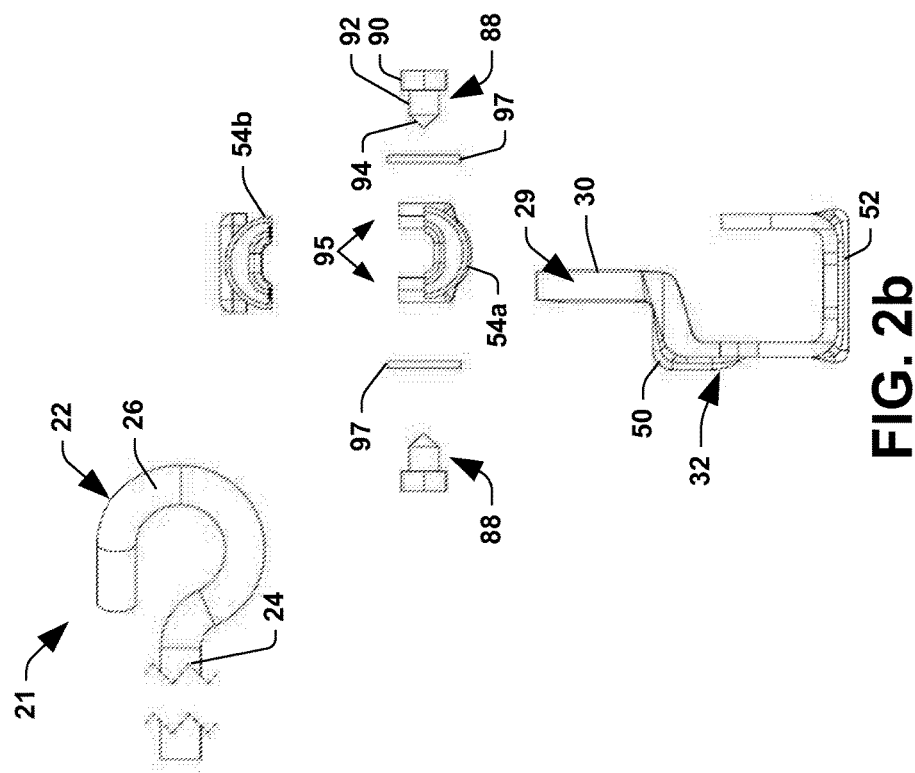

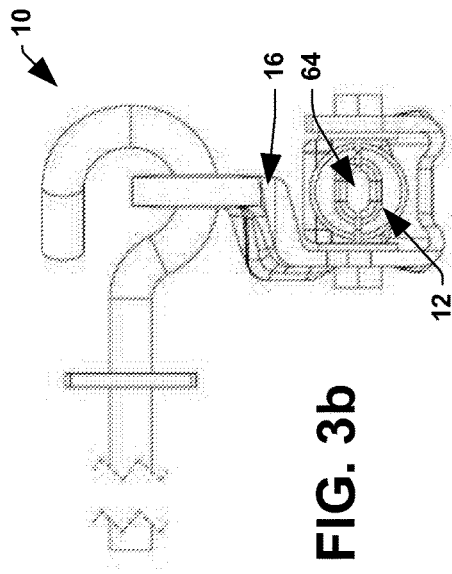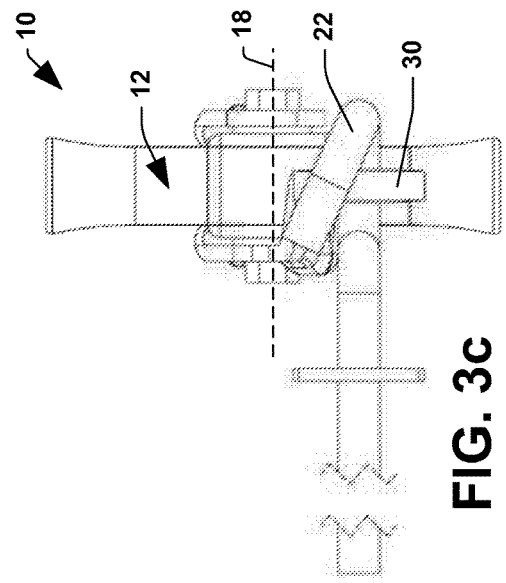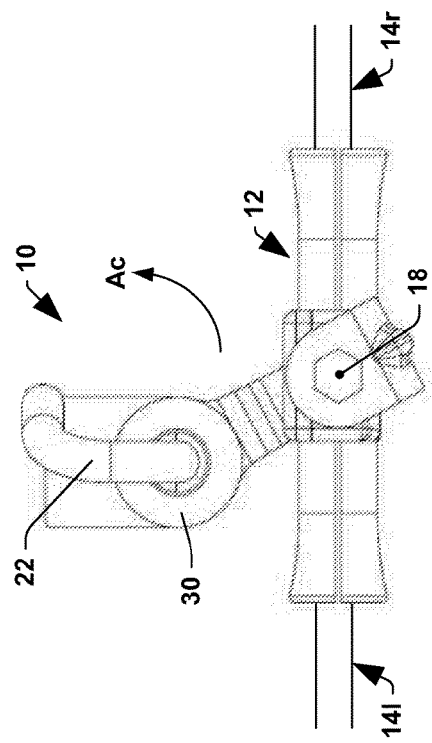

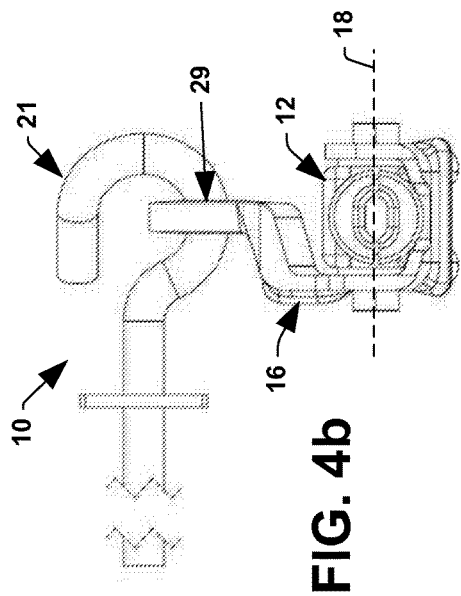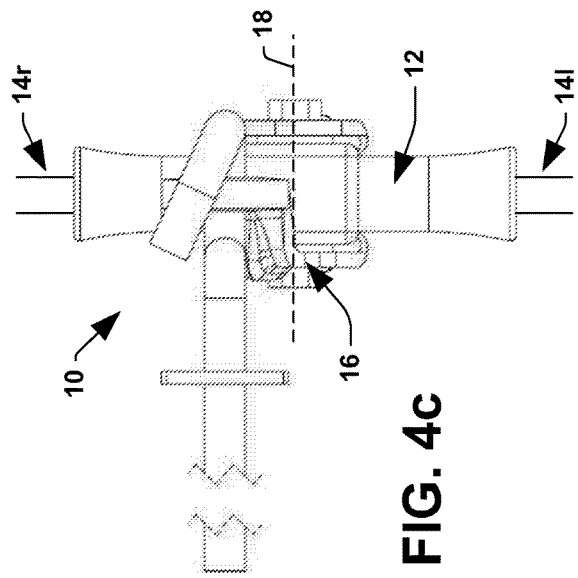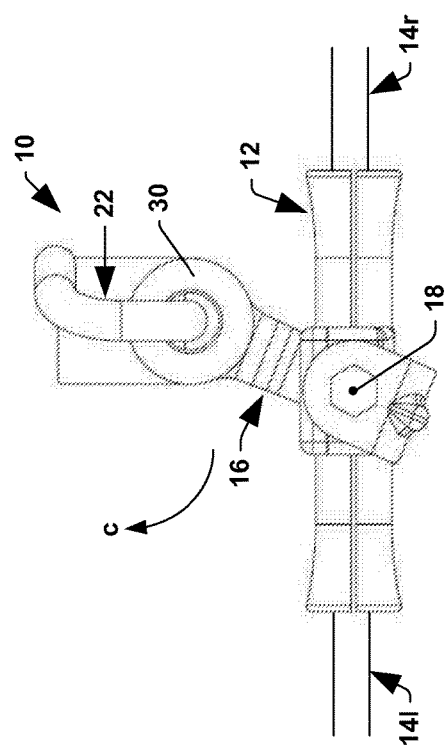

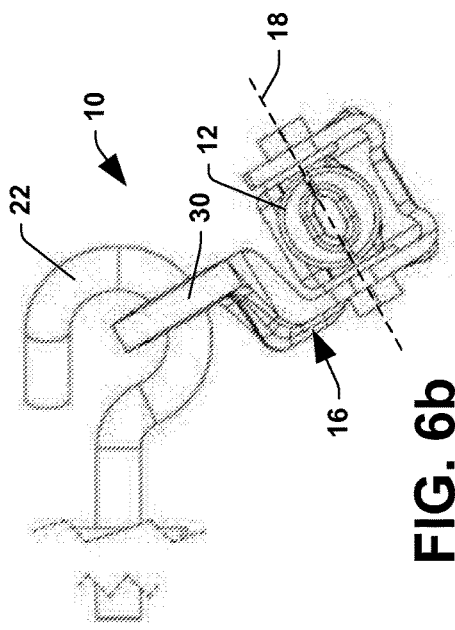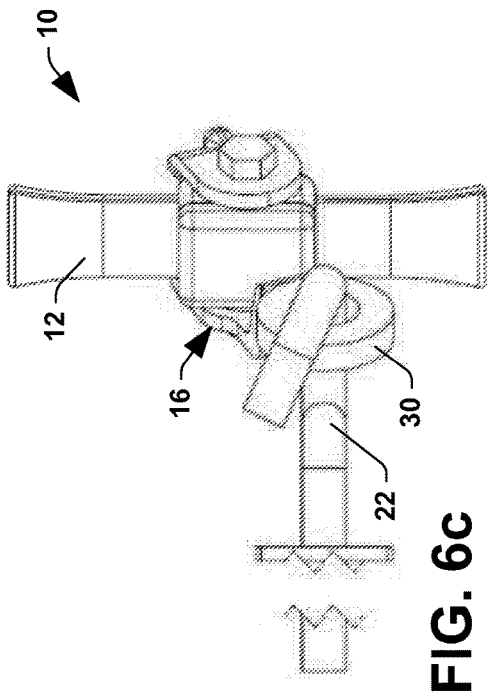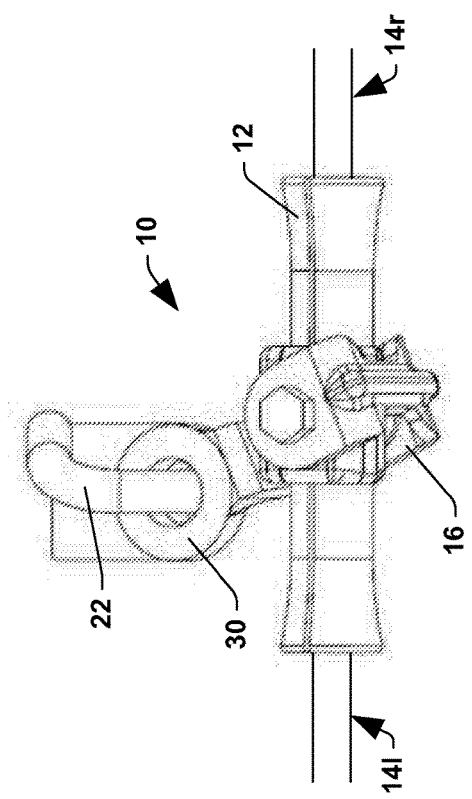

CABLE SUSPENSION

REFERENCE TO RELATED APPLICATION

This application is a continuation of and claims priority to U.S. patent application Ser. No. 14/765,624, titled "A CABLE SUSPENSION" and filed on Aug. 4, 2015. U.S. patent application Ser. No. 14/765,624 is a National Phase Entry of PCT/US2014/014580, titled "A CABLE SUSPENSION" and filed on Feb. 4, 2014, which claims priority to U.S. Provisional Application No. 61/760,616, titled "A CABLE SUSPENSION" and filed on Feb. 4, 2013. U.S. patent application Ser. No. 14/765,624, PCT/US2014/014580, and U.S. Provisional Application No. 61/760,616 are incorporated herein by reference.

TECHNICAL FIELD

A cable suspension is disclosed to facilitate supporting cables from poles and towers.

BACKGROUND

Suspension fittings of various configurations are known for supporting cables on and between poles and towers. Respective fittings are suspended from corresponding poles. A cable is supported by running continuously through each fitting and from fitting to fitting. A length of cable between adjacent suspension fittings (e.g. poles) is known as "a span."

A function of a suspension fitting is to mitigate the deleterious effects of static and dynamic loads on a supported cable. Cables are subjected to static loads arising from the effects of gravity and differentials in span lengths and/or misalignment of spans on opposite sides of the suspension. Dynamic loads may arise from the effects of wind, vibration, for example, from road traffic, and from animals such as birds, and in particular flocks of birds landing and alighting from suspended cables, or possums walking along the cables. These loads may cause the cable to move in a plane transverse or parallel to its length. Loads in the transverse plane may be termed as "swing" loads (and produce swing motion), while loads in the parallel plane may be termed as "sway" loads (and produce sway motion).

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

The motion arising from static and dynamic loads may cause localized bending of the cable immediately adjacent to the opposite sides of the fitting. Ideally this angle should be the same on each side and thus produce a zero deviation angle. The deviation angle is the difference in bend angle on each side of the fitting. However, in practice, previous fittings, particularly when subjected to sway loads, are unable to produce a non-zero deviation angle.

In broad terms in a first aspect there is disclosed a cable suspension which allows a cable to be pivoted about a pivot axis that passes through a thickness of a cable. The general idea here is to increase a bend radius of the cable entering and exiting the cable suspension, e.g. reducing the degree of bend by a cable entering and exiting the cable support.

In the context of the present specification "cable" is intended to include but is not limited to insulated electrical cables, non-insulated electrical cables (also known in the art as "conductors'), shielded cables, non-electrical signal cables such as but not limited to optical cables, or assemblies thereof. The insulated or non-insulated electrical cables can include cables made from a single or multiple strands, and in the latter case, may be twisted or bundled together. Due to their physical characteristic, optical fibers are less robust than electrical cables and generally require greater protection or isolation from mechanical strain. It is not an essential requirement that the cable be used or indeed be capable of carrying electrical and/or optical power or signals. The cable may be in the form of a cable used to support a mechanical load, such as, for example, mechanical support cables on suspension bridges or from which electrical cables are suspended for electrified rail systems.

The disclosed cable suspension may be more particularly arranged so that the pivot axis passes through or closely adjacent to a center line of a cable received in or supported by the cable suspension.

In broad terms the cable suspension has a body configured to receive or seat a cable, and a bracket that is pivotally coupled to the body about the pivot axis. The bracket may be arranged to couple to a support, such as a pole or tower, at a location disposed above the pivot axis. This enables the cable suspension to be suspended, for example, from a hook that may be attached to a pole or tower. The bracket may be provided with a coupling mechanism to facilitate the coupling of the bracket to the support. The coupling can be arranged to enable the bracket and thus the body to move in a swing plane that lies parallel to the pivot axis. The coupling mechanism may also enable the bracket and thus the body to move in a sway plan that lies transverse to the pivot axis.

The ability for the bracket to move in the swing plane and/or the sway plane provides the cabled suspension with multiple degrees of freedom of movement to assist in mitigating stress, strain, and fatigue in a cable.

In a first aspect there is disclosed a cable suspension comprising: a body configured to receive a cable and a bracket pivotally coupled to the body about a pivot axis and arranged to couple to a support at a location above the pivot axis. The pivot axis is orientated to pass through a thickness of a cable received in the body.

In an embodiment the pivot axis is orientated to intersect with or lie closely adjacent to a center line of a cable received in the body.

In an embodiment the bracket is arranged to couple to the support in a manner to enable the body to move in a swing plane that lies parallel to the pivot axis.

In the same or an alternate embodiment the bracket is arranged to couple to the support in a manner to enable the body to move in a sway plane that lies transverse to the pivot axis.

In an embodiment the pivot axis lies in a transverse center plane of the body.

In an embodiment the cable suspension comprises a damping system operatively coupled between the body and the bracket and arranged to dampen motion about the pivot axis.

In an embodiment the damping system comprises at least one elastomeric member interposed between the body and the bracket.

In an embodiment the body comprises a plurality of demountable parts configured to encircle, and couple together about, an outer circumferential surface of a cable.

In an embodiment the bracket comprises a first coupling part. The first coupling part may comprise a loop structure such as but not limited to an annulus or ring arranged to facilitate articulated coupling of the body to the support. The articulated coupling enables the movement in the sway plane and swing plane. Moreover a second coupling part may be provided that is configured for engagement with the first coupling part. The second coupling part may be attached or attachable to the support. The second coupling part may comprise a hook. The hook may be attached or attachable to the support. The first and second coupling parts together may be considered as forming a mounting interface that enables an articulated coupling of the body with the support at a location above the pivot axis.

In an embodiment the bracket forms first part of a mounting interface that enables an articulated coupling with a support. In this embodiment the mounting interface also comprises a second part that is either attached to the support or is attachable to the support, wherein the first and second parts are configured to be mutually engaged to facilitate articulation of the cable suspension on the support. In an example the first part comprises a closed loop structure and the second part comprises a hook. The closed loop structure may be in the form of an annulus or a ring at one end of the bracket.

In an embodiment the bracket comprises two arms between which the body is located and wherein the pivot axis passes through the arms.

In an embodiment the bracket comprises a cradle that extends across an underside of the body and wherein the pivot axis passes through the cradle.

In a second aspect there is disclosed a cable suspension comprising: a body configured to receive a cable; a bracket pivotally coupled to the body about a pivot axis; and a mounting interface that enables an articulated coupling of the body with the support at a location above the pivot axis. The pivot axis is orientated to pass through a thickness of a cable received in the body.

In an embodiment the mounting interface comprises a first coupling part and a second coupling part, the first coupling part being a part of or otherwise attached to the bracket and the second coupling part being attached to or attachable to the support wherein the first and second coupling parts are configured to be mutually engaged.

In an example the first coupling part comprises a loop structure and the second coupling part comprises a hook. The loop structure may be in the form of an annulus or a ring at one end of the bracket.

The following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

Notwithstanding any other forms that may fall within the scope of the cable support as set forth in the Summary, specific embodiments will now be described, by way of example only, with reference to the accompanying drawings in which:

FIG. 1a is a front elevation view of an embodiment of a cable suspension in an equilibrium state where loads acting on a cable supported by the cable suspension are balanced in (e.g., one or more and/or all) directions so that a bracket of the cable support lies in a substantially vertical plane and a body of the cable suspension lies in a substantially horizontal plane.

FIG. 1b is a side elevation of the cable suspension illustrated in FIG. 1a.

FIG. 1c is a plan view of the cable suspension illustrated in FIGS. 1a and 1b.

FIG. 2a is an isometric exploded view of the cable suspension illustrated in FIG. 1a.

FIG. 2b is a side elevation exploded view of the cable suspension show in FIG. 1a.

FIG. 3a is a front elevation of the cable suspension illustrated in FIG. 1a in an unbalanced state where the load applied by the cable on the right side of the cable suspension is greater than the load applied by the cable on the left side of the cable suspension, causing the body to sway in an anticlockwise direction in a sway plane that is generally coplanar with the cable spans.

FIG. 3b is a side elevation of the cable suspension illustrated in FIG. 3a.

FIG. 3c is a plan view of the cable suspension illustrated in FIGS. 3a and 3b.

FIG. 4a is a front elevation of the cable suspension illustrated in Figure 1a in an unbalanced state where the load applied by the cable on the left side of the cable suspension is greater than the load applied by the cable on the right side of the cable suspension, causing the body to sway in an clockwise direction in a sway plane that is generally coplanar with the cable spans.

FIG. 4b is a side elevation of the cable suspension illustrated in FIG. 4a.

FIG. 4c is a plan view of the cable suspension illustrated in FIGS. 4a and 4b.

FIG. 5b is a side elevation of the cable suspension illustrated in FIG. 5a.

FIG. 6a is a front elevation of the cable suspension illustrated in FIG. 1a illustrating the effects of unbalanced loads in a sway plane, that is generally coplanar with the cable spans, and a swing plane, that is generally transverse to the cable spans. The net effect of the forces causes the cable suspension to swing away from a supporting structure and sway in an anticlockwise direction.

FIG. 6b is a side elevation of the cable suspension illustrated in FIG. 6a.

FIG. 6c is a plan view of the cable suspension illustrated in FIGS. 6a and 6b.

FIG. 8b is a front isometric view of the cable suspension illustrated in FIG. 8a.

FIG. 8c is a front elevation view of the cable suspension illustrated in FIG. 8a.

FIG. 8d is a side elevation of the cable suspension illustrated in FIG. 8a.

FIG. 8e is a rear elevation view of the cable suspension illustrated in FIG. 8a.

FIG. 10a is a side elevation exploded view of the cable suspension show in FIG. 8a.

FIG. 10b is an isometric exploded view of the cable suspension illustrated in FIG. 8a.

DETAILED DESCRIPTION

Figure 5B:
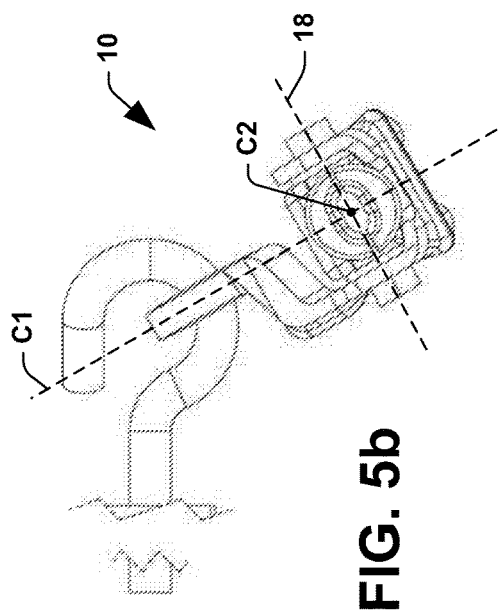

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

FIGS. 1a-2b depict an embodiment of the cable suspension 10. The cable suspension 10 comprises a body 12 configured to receive a cable 14 and a bracket 16 that is pivotally coupled to the body 12 about a pivot axis 18 and is further arranged to couple to a support at a location above the pivot axis 18. The pivot axis 18 is orientated to pass through a thickness of the cable 14 received in the body 12. As will be explained in greater detail below, this embodiment of the cable suspension 10 is able to maintain a portion of the cable 14 within the body 12 in a substantially horizontal plane under various static and dynamic load conditions that are expected or reasonably foreseeable and maintain a large bending radius of the cable 14 on opposite sides of the body 12 thereby limiting and/or decreasing the degree of bend in the cable 14.

In FIGS. 1a-2b, the cable suspension 10 is depicted in a substantially balanced or equilibrium load condition. In this condition the net of the static and dynamic loads and forces acting on the cable suspension 10 and received cable 14 are such that the bracket 16 hangs substantially like a plumb line so that a longitudinal center line C1 of the bracket 16 lies in a vertical plane and is perpendicular to the horizontal plane. Further, a center line C2 of a portion of the cable 14 received in the body 12 is held in a horizontal plane. Indeed, embodiments of the cable suspension 10 function in the manner to maintain the center line of the portion of the cable 14 within the body 12 in a horizontal plane in majority of foreseeable static and dynamic load conditions. As a result a bending radius of the cable 14 as it enters and exits the body 12 is enhanced and/or increased (e.g. the degree of bend of the cable 14 adjacent to the opposite ends of the body 12 is limited and/or decreased).

Figure 7:
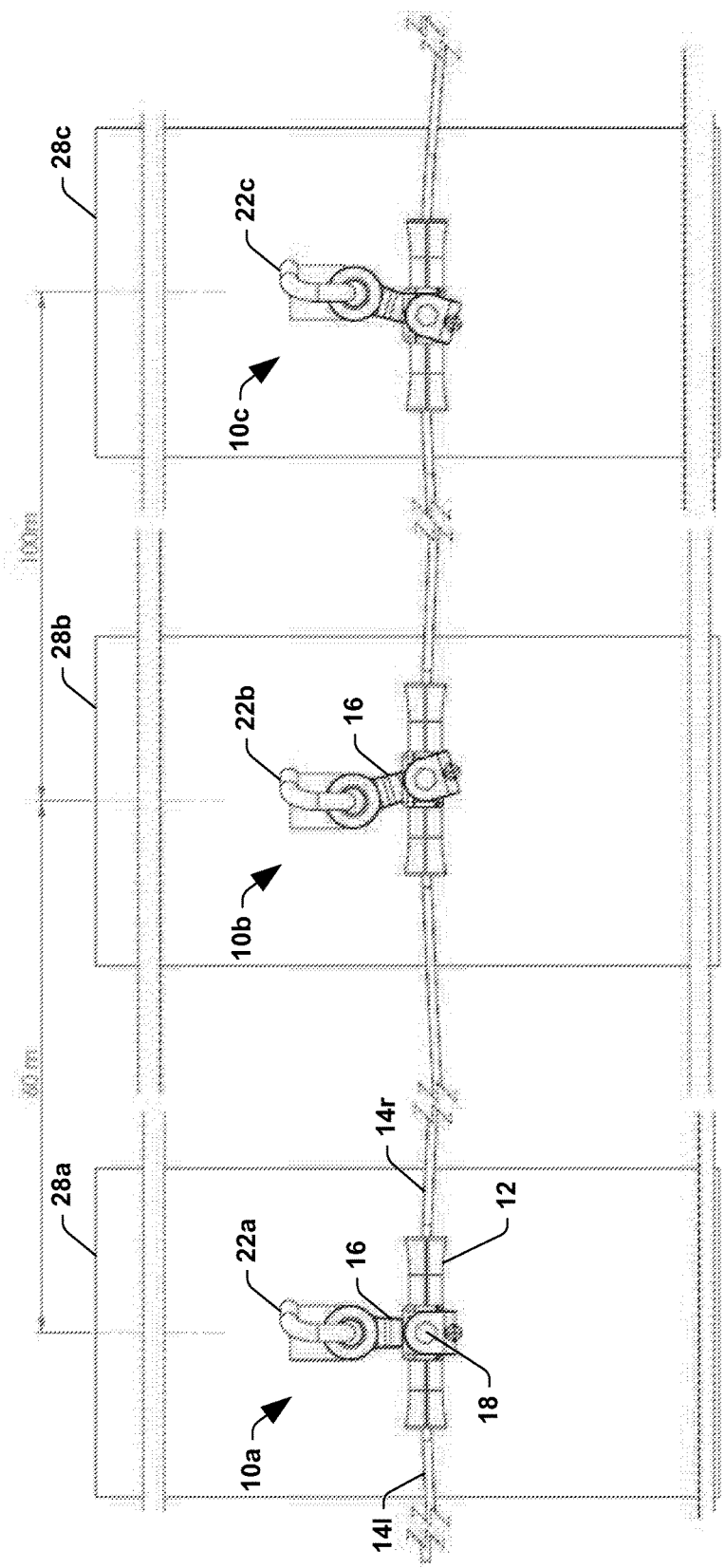
FIG. 7 is a front elevation view of a cable suspended from cable suspensions that are mounted to three adjacent posts. There is a static load imbalance on the opposite sides of the cable suspension mounted to the middle post that causes the cable suspension to sway anticlockwise in a sway plane that is generally coplanar with the cable spans.
Figure 8A:
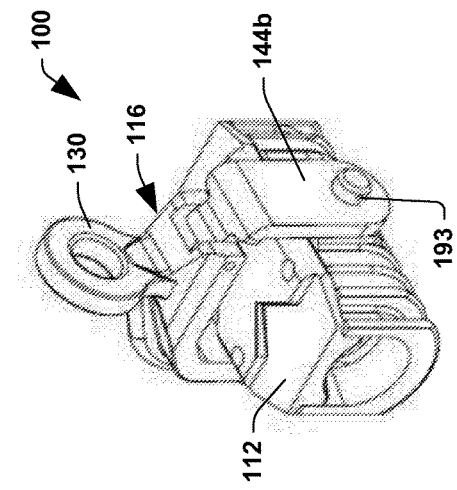
FIG. 8a is a rear isometric view of an alternate embodiment of cable suspension comprising a U-shaped portion that extends over the top of the body with two arms that depend from a bridge to support the cable suspension body. One of the arms is hinged to allow a cable to be inserted into the body.
Figure 8B:
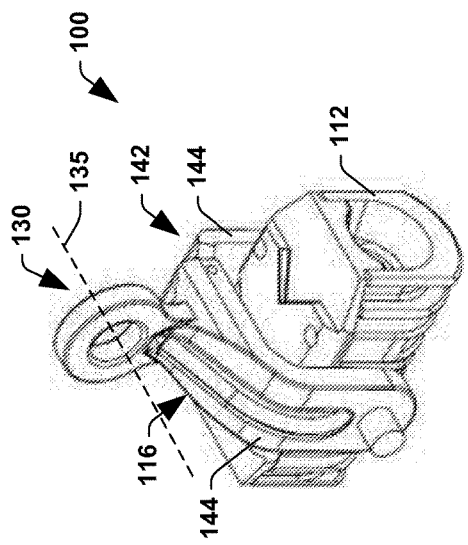
Figure 8E:
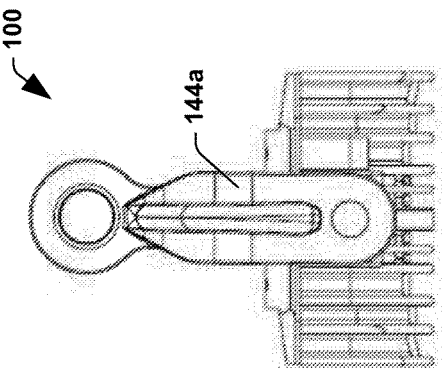
Figure 8D:
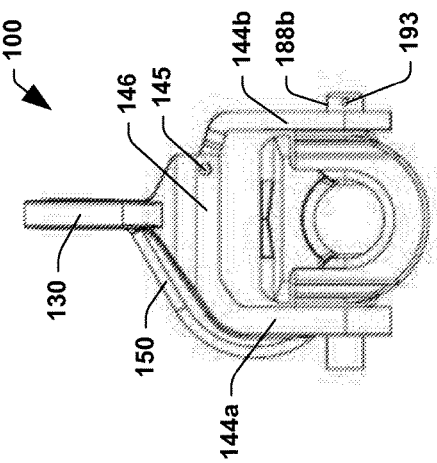
Figure 8C:
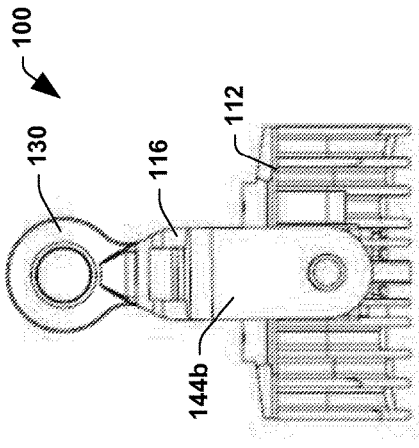
Figure 9B:
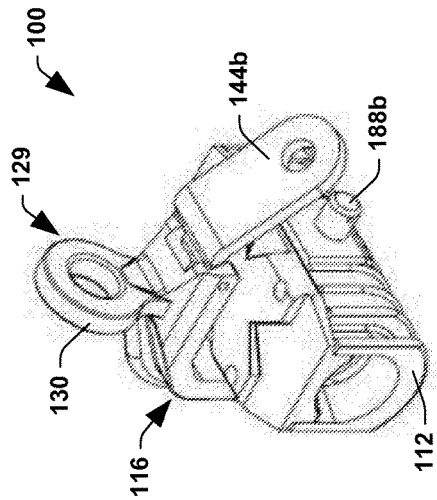
FIG. 9b is a front isometric view of the cable suspension illustrated in FIG. 8a with the hinged arm displaced from the front of the body to facilitate insertion of a cable.
Figure 9D:
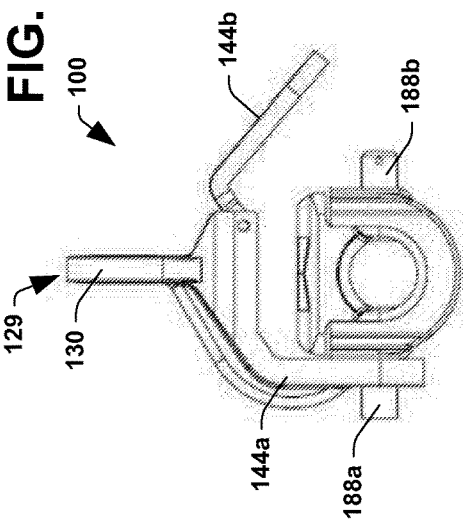
FIG. 9d is a side elevation of the cable suspension illustrated in FIG. 8a with the hinged arm displaced from the front of the body to facilitate insertion of a cable.
Figure 9A:
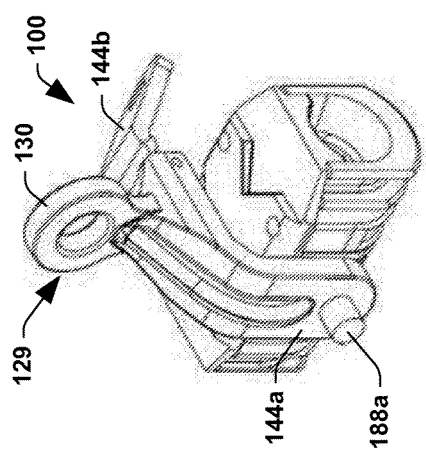
FIG. 9a is a rear isometric view of the cable suspension illustrated in FIG. 8a with the hinged arm displaced from the front of the body to facilitate insertion of a cable.
Figure 9C:
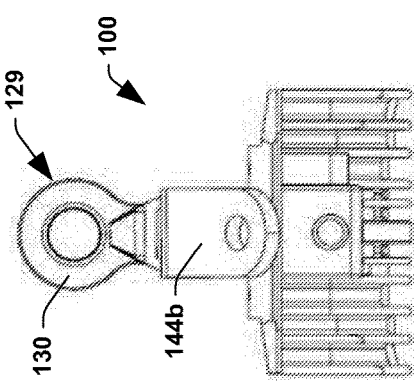
FIG. 9c is a front elevation view of the cable suspension illustrated in FIG. 8a with the hinged arm displaced from the front of the body to facilitate insertion of a cable.

In the present described embodiments the support comprises a pole or tower and/or support (see FIG. 7). The coupling of the suspension 10 to the support is via a first coupling part 29. The first coupling part 29 is formed as a part of, or is otherwise attached to, the bracket 16. The coupling of the suspension 10 via the first coupling part 29 enables an articulated coupling of the suspension 10 to the support in a sway plane and a swing plane. These planes will be described shortly. The first coupling part 29 engages a complimentary second coupling part 21. The second coupling part 21 is attached, or otherwise attachable, to the support. The parts 29 and 21 are configured to be mutually engaged to facilitate articulation of the cable suspension 10 on the support.

The coupling part 29 is in the form of a loop structure of the bracket 16 and is exemplified in the Figures as an annulus (or ring or washer) 30. The second coupling part 21 is exemplified in the Figures as a hook 22 having a straight shank 24 and a contiguous arcuate hook portion 26. The hook 22 is attached so that the shank 24 extends perpendicular to the pole and in a substantially horizontal plane. Together the coupling parts 29 and 21 may be considered as constituting a mounting interface 31 that facilitates articulation of the body 12 and thus cable suspension 10 on the support. As explained below this articulation is manifested by a sway motion of the suspension 10 in a plane parallel to the general direction of the cable 14, and a swing motion of the suspension in a general direction transverse to the direction of the cable.

Looking at the components of the cable suspension 10 in greater detail and with particular reference to FIGS. 2a and 2b, it will be seen that in this embodiment the bracket 16 comprises a cradle 32 attached to the coupling part 29/annulus 30. The annulus 30 has a central through-hole 34 defined by an inner circumferential surface 36. The cradle 32 is formed with a ledge 38 to which an outer circumferential surface 40 of the annulus 30 is attached. This attachment may for example be achieved by welding. Alternately, the annulus 30 and cradle 32 may be integrally formed. Depending from the ledge 38 is a generally U-shaped portion 42 of the cradle 32. The U-shaped portion 42 comprises a pair of parallel lugs or arms 44 which are spaced and attached to each other by an integrally formed bridge 46. Mutually aligned threaded holes 48 are formed in the lugs 44. A center line of the holes 48 coincides with the pivot axis 18. Strengthening fillets or webs 50 and 52 are provided on an outside of the bracket 16 to assist in resisting distortion or other bending of the bracket 16.

The body 12 comprises a plurality of demountable parts including a first shell 54a and a second shell 54b (hereinafter referred to in general as "shells 54"). The shells 54 are configured to encircle and couple together about an outer circumferential surface of the cable 14. Conceptually the shells 54 may be viewed as being formed by splitting the body 12 in a horizontal plane. The shell 54a is formed with a longitudinally extending channel 58 that seats the cable 14. The channel 58 includes a central or intermediate portion 60 and contiguous opposite end portions 62. A center line 60L of the portion 60 is straight. However a center line 62L of the end portion 62 is curved with increasing radius in a direction away from the central portion 60 to the distal ends of the body 12. The curvature of the center line 62L and corresponding end portions 62 may comprise a single fixed radius or a plurality of progressively increasing radii that form a substantially smooth curve.

A central passage 64 is created in the body 12 when the shells 54 are coupled together. The passage 64 has an ovoid like shape in cross section. The shape of the passage 64 (and thus the channel 58) is dependent upon the shape and configuration of the cable 14 to be received and otherwise supported by the suspension 10. Thus this will vary for embodiments of the cable suspension required to support cables of different cross sectional shape, such as a circular.

A pair of walls extends from opposite sides of the central portion 60. In an embodiment the walls are formed as an integral portion of the shell 54a. The walls are provided with respective blind holes 68 that are in alignment with each other and the pivot axis 18. The holes 68 are formed with a conical toe.

The walls are also formed with planar top surfaces 70. A single threaded blind hole 72 is formed in each of the walls 70 from its top surface 72. In this embodiment the holes 72 are diametrically opposed to each other.

The shell 54b has a central portion 76 and contiguous and opposite end portions 78. A channel 80 is formed along the central and end portions 76 and 78 which faces the channel 58. The channel 80 has a shape and configuration that is symmetric to that of channel 58 about a horizontal plane containing the pivot axis 18. A connection plate 82 is formed on an outer surface of the central portion 76 and is configured to overlie and engage the walls. Further, the plate 82 is formed with diagonally opposed holes 84 that align with the holes 72. Mechanical fasteners 86 are passed through the holes 84 and engage the holes 72 via threads to effectively clamp the shells 54a and 54b together. Cable 14 is received in the body 12 by undoing the fasteners 86 so that the shells 54 can be separated, and subsequently placing the shells 54 about a length wise portion of the cable 14 and then clamping or otherwise coupling the shells 54 together by use of the fasteners 86.

The body 12 is attached to the bracket 16 by pivot screws 88. As illustrated most clearly in FIG. 2b, each pivot screw 88 is formed with a hexagonal head 90, a shank 92, and a conical end 94. A portion of the shank 92 immediately adjacent the head is formed with a screw thread to engage the thread on a respective hole 48. However the remainder of the length of the shank 92 to the end 94 is smooth. This forms a bearing surface for the body 12 to pivot on.

When assembling the cable suspension 10, the body 12 is placed within the bracket 16 and in between the lugs 44 so that the holes 48 are in alignment with the holes 68. Pivot screws 88 are now screwed into holes 48 from the outside of the lugs 44, and the unthreaded part of each shank 92 extends into corresponding blind holes 68 of the walls. The extent of penetration of the screws 88 into the holes 68 is limited by the abutment of the conical surfaces 94 with corresponding conical surfaces in the blind holes 68. Specifically, the cable suspension 10 is arranged so that when the screws 88 are fully screwed into the holes 48 the head 90 does not clamp the bracket 16 against the body 12. Rather sufficient spacing is provided to enable the body 12 to pivot on the bearing surfaces formed by the shanks 92 and about the pivot axis 18. As will be recognized the pivot axis 18 corresponds with the central axis of the screws 88, holes 68 and holes 48.

Optionally, a damping system 95 may be incorporated in the cable suspension 10. The damping system 95 is operatively coupled between the body 12 and the bracket 16 to dampen motion about the pivot axis 18. In the present embodiment, the damping system 95 comprises elastomeric members in the form of washers 97 located between the walls and the lugs 44 and through which respective pivot screws 88 pass.

It should be understood that while the pivot axis 18 extends or otherwise passes through a thickness of the cable 14 received within the body 12, there is no physical pivot axle, pin, or other member that passes through the thickness of the cable 14. In a configuration the pivot axis 18 passes through or intersects with a center line of the cable 14.

With particular reference to FIGS. 1a-1c, it will be appreciated that the bracket 16 is provided with a plurality of degrees of freedom of movement. In particular, the bracket 16 due to the engagement of the annulus 30 to the hook 22 can swing in a plane that lies parallel to the pivot axis, and can move in a sway plane that lies transverse to the pivot axis 18. This motion comes about due to the configuration of the annulus 30 which is in the form of an annulus that is engaged by the hook 22. With particular reference to FIG. 1a the bracket 16 can sway from side to side in the sway plane that coincides with the plane of Figure 1a and is perpendicular to the pivot axis 18. This motion can be considered as equivalent to the annulus 30 pivoting in the plane of FIG. 1a about the hook 22 in clockwise or anti-clockwise directions indicated by arrows C and AC.

FIG. 1b illustrates the freedom of movement of the bracket 16 and thus the cable suspension 10 in the swing plane. The swing plane lies parallel to the pivot axis 18 and coincides with the plane of FIG. 1b. Movement of the bracket 16 and thus body 12 in the swing plane coincides with the annulus 30 riding forwards or backwards along the curve of the hook 26. This may occur for example in response to wind loading from a breeze predominantly from the left hand side or the right hand side of FIG. 1b.

It should also be understood that motion of the bracket 16 and body 12 in the swing and sway planes is not mutually exclusive. Rather, such motions may and will often occur simultaneously. Further, due to the pivot coupling of the bracket 16 to the body 12 about the pivot axis 18, the body 12 and thus the section of cable 14 received within the body 12 will be maintained in a substantially horizontal plane irrespective of the degree of swing or sway.

The range of motion of the cable suspension 10 that is available due to the structural and functional features is specifically illustrated in FIGS. 3a-6c.

FIGS. 3a-3c illustrate the cable suspension 10 when the bracket 16 is swayed in an anticlockwise direction AC in the sway plane. This may arise due to for example an unbalanced static load on opposite sides of the suspension 10 owing to different span lengths 14r and 14l on the right and left sides respectively of the body 12. For example the length of the span 14r may be 100 m whereas the length of the span 14l may be 60 m. Provided there are no other dynamic or static forces acting and that the spans 14l and 14r lie in the substantially the same vertical plane, then the suspension 10 will move in the sway plane with the bracket 16 pivoting in the anticlockwise direction about the hook 22. The body 12, and thus the portion of a cable supported therein, is maintained in a substantially horizontal plane due to pivoting of the body 12 about the pivot axis 18.

FIGS. 4a-4c depict a similar situation to that of FIGS. 3a-3c but where the static load is unbalanced so as to be greater on the left hand side of the body 12 rather than the right hand side. This may be brought about for example by the span 14l being of greater length than the span 14r. Now the bracket 16 and thus the body 12 are pivoted in the clockwise direction C in the sway plane about the hook 22.

The body 12 is maintained in a substantially horizontal plane in relation of the pivot axis 18. It is assumed that the cable 14 received by the suspension 10 is also received by adjacent suspensions 10 which are hung at the same vertical height on adjacent posts as the suspension 10 in question as illustrated for example in FIG. 7.

Figure 5C:
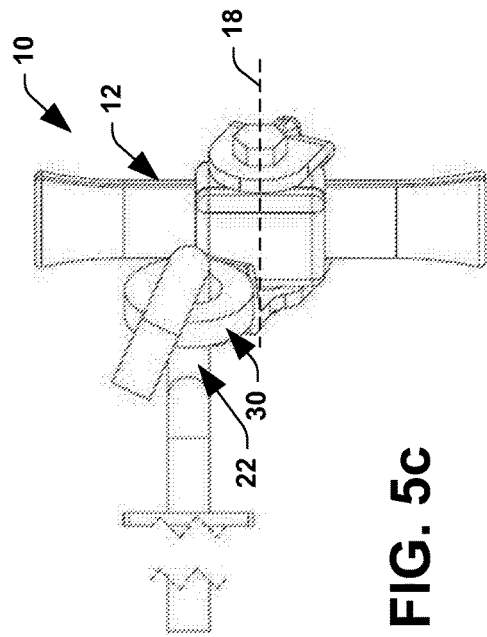
FIG. 5c is a plan view of the cable suspension illustrated in FIGS. 5a and 5b.
Figure 5A:
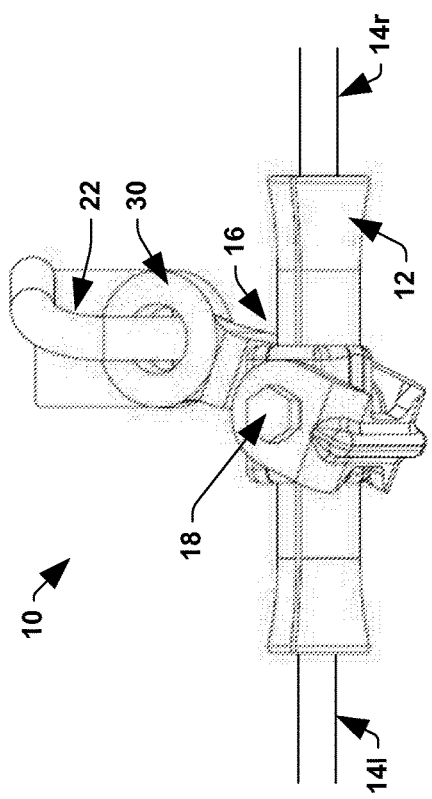
FIG. 5a is a front elevation of the cable suspension illustrated in FIG. 1a illustrating the effects of unbalanced loads in a sway plane, that is generally coplanar with the cable spans, and a swing plane, that is generally transverse to the cable spans. The net effect of the forces causes the cable suspension to swing away from a supporting structure and sway in a clockwise direction.

FIGS. 5a-5c illustrate the effects of a plurality of dynamic and/or static forces on a cable 14 supported by the suspension 10. Here the net effect of the forces has the effect of causing both a swing and a sway of the bracket 16 and thus the body 12 and a consequential pivoting of body 12 about the pivot axis 18. In particular in these Figures, it will be seen that the bracket 16 undergoes a combined motion of swaying in a clockwise direction about the hook 22 while also swinging upwardly (e.g. riding up a forward portion of the hook 22). This motion may occur for example by action of the span length 14l being longer than the span length 14r and one or both of the action of a wind blowing from left to right with reference to FIG. 5b, and due to a non-zero angle of deviation between mutually adjacent poles from which the suspensions 10 are supported.

FIGS. 6a-6c illustrate the effect of a similar set of forces as in FIGS. 5a-5c with the difference being a predominate static load being applied to the span 14l rather than 14r.

FIG. 7 depicts a cable 14 suspended on three adjacent poles 28a, 28b, and 28c by cable suspension 10a, 10b and 10c. The suspensions 10a, 10b, and 10c are identical to the suspension 10 described in FIGS. 1a-2c. The poles 28a, 28b, and 28c lie in the same line and each of the hooks 22a, 22b, and 22c are mounted at the same height on their respective poles. In this example the spacing between poles 28a and 28b is 60 meters while the spacing between poles 28b and 28c is 100 meters. It is also assumed that cable span 14l on the left hand side of cable suspension 10a is 60 meters while the length of the span 14r on the right hand side of cable suspension 10c is less than 100 meters. Thus there is a static load imbalance on opposite sides of the cable suspension 10b. In particular there is a greater static load on the right hand side of cable suspension 10b than the left hand side. As a consequence the bracket 16 of cable suspension 10b sways in the anticlockwise direction about the corresponding hook 22b.

FIGS. 8a-10b depict a second embodiment of a cable suspension. In the second embodiment the cable suspension is denoted by the reference number 100. Features of the cable suspension 100 that have the same or similar structure or function as features in the cable suspension 10 are denoted by reference numbers which have been incremented by 100 with respect to the reference numbers used for the cable suspension 10. For example, the cable suspension 100 comprises a body 112 configured to receive a cable, and a bracket 116 pivotally coupled to the body 112 about a pivot axis. The bracket 116 is also arranged to couple to a support in the form of a hook (not shown) at a location above the pivot axis. The pivot axis is orientated to pass through a thickness of and most perfectly through a center of a cable received in the body 112.

The differences between the cable suspensions 10 and 100 lay in the specific configuration of the bracket 116 and the body 112.

The bracket 116 is formed with a U-shaped portion 142 however in this embodiment the U-shaped portion 142 extends over the top and down the sides of the body 116 rather than lying beneath and in effect cradling the body as in the cable suspension 10. The U-shaped portion 142 has a bridge 146 that extends above and across the body 112 and to which the annulus 130 is attached. Depending from and formed integrally with one side of the bridge 146 is a lug or arm 144a. A second lug or arm 144b is pivotally coupled to the bridge 146 and extends down an opposite side of the body 112. Lug 144b is hinged on a hinge pin 145 so that it can be selectively disconnected from a pivot screw 188b. A strengthening web 150 extends along a side of the lug 144a opposite the body 112 and to the annulus 130.

Figure 10A:
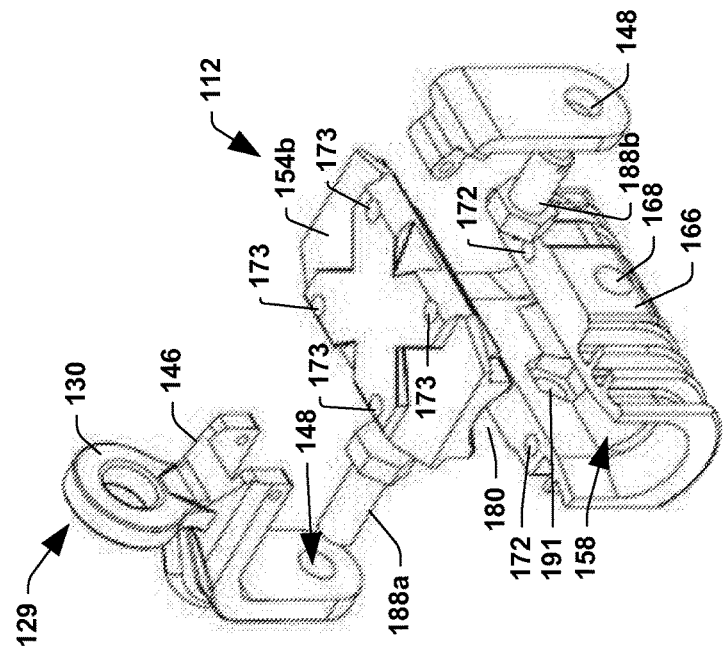
Figure 10B:
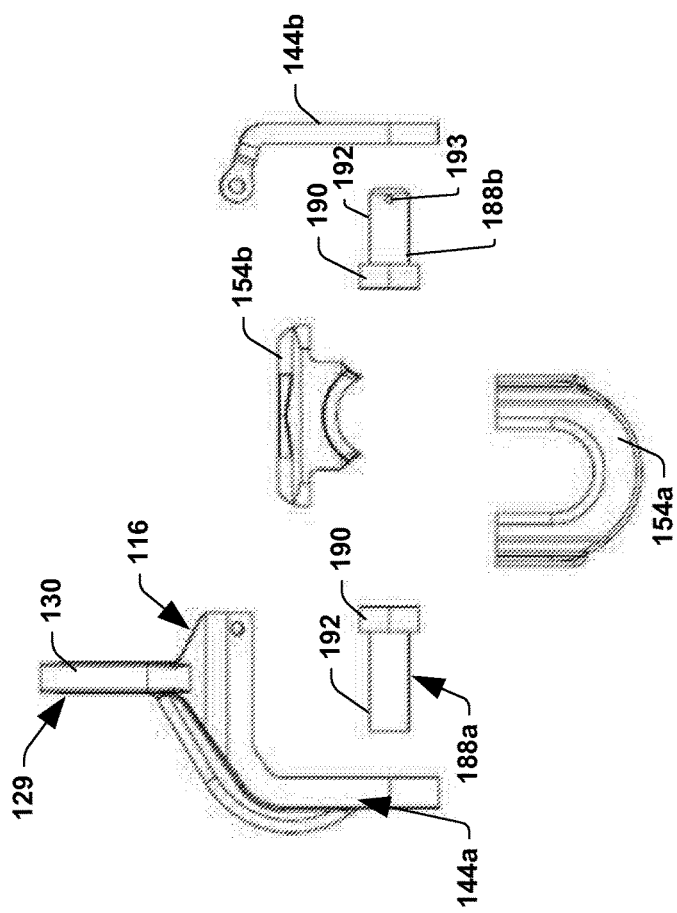

As seen in FIGS. 10a and 10b the body 112 comprises a plurality of demountable parts including a first shell 154a and second shell 154b. The shell 154a is formed with a relatively deep channel 158 while the shell 154b is formed with a relatively shallow channel 180 which faces the channel 158. The difference in the relative depth of the channels 158 and 180 arises from the manner in which the pivot coupling of the bracket 116 to the body 112 is formed. In particular pivot screws 188a and 188b are orientated so that their respective heads 190 are disposed on the inside of and engage complimentary shaped recesses 191 in the shell 154a. The shell 154a has thickened wall portions 166 located centrally along the length of the channel 158 and on opposite sides thereof. Each wall 166 is formed with a hole 168 through which the shank 192 of screw 188 extends. The channel 158 may be formed with a central portion and contiguous opposite end portions of similar configuration to that of central portion 60 and end portion 62. Thus the central portion may be formed with a straight center line, while the end portions may be formed with center lines that curve or bend away from axial center line of a passage 164 of the body 112. The curving of the end portions may take the same form as the curving of the portions 62.

Upper surfaces of the walls 166 form abutment surfaces for the shell 154b. In addition, threaded blind holes 172 extend into the walls 166 from the top surface.

The shell 154b is formed with four through holes 173 that pass from an upper side to an underside of the shell 154b. The holes 173 are located at corners of an imaginary rectangle and two of the diagonally opposed holes 173 are arranged to align with the holes 172.

To assemble the cable suspension 100 the pivot screws 188a and 188b are inserted into the holes 168 from the inside of a channel 158. Thus the heads 190 seat in complimentary shaped recesses 191. The shanks 192 extend from the holes 168. A cable can then be placed in the channel 158. Thereafter, the shell 154b is placed over the shell 154a and mechanical fasteners such as screws (not shown) pass through two of the holes 173 that align with and engage in threads in the threaded blind holes 172. Next, either the lug 114b can be pivotally connected to the bridge 146 by a pivot pin, or alternately the lug 144a can be passed onto the shank 192 of the pivot screw 188a. In either case, a nut or other engagement mechanism can be attached to the portion of the shank 192 extending from the lug 144a to pivotally connect the lug 144a to the pivot screw 188a. Next, the lug 144b is engaged onto the shank 192 of the pivot screw 188b. In this embodiment it is seen that the shank 192 is formed with a through-hole 193. This hole may receive a split pin or other mechanical stop that presents the lug 144b from sliding off the shank 192.

The pivot axis is an axis that is coincident with the center of the holes 168, shanks 192, and holes 148. Pivot axis passes through a center line of a cable received in the body 112. The geometric relationship between the pivot axis, a cable passing through the body 112, and the bracket 16 and in particular the annulus 130 is the same as in the cable suspension 10. Thus the range of motion and function of the cable suspension 100 is exactly the same as that of the cable suspension 10.

While a number of specific embodiments of the cable suspension have been described it should be appreciated that the cable suspension may be embodied in many other forms. For example, the bodies 12 and 112 are depicted as being formed from two main demountable components namely shells 54a and 54b or shells 154a and 154b. However the bodies 12 may be made from a larger number of parts that are assembled together. It a further variation is possible to form the passage 64 with a circular cross section and fit inserts within the passage 64 that are configured to form a channel of a shape appropriate for the cable 14. The spacing between suspensions 10 and associated span lengths described in relation to FIG. 7 are exemplary only and not intended to indicate performance limits of embodiments of the suspension. Also in the described embodiments the first coupling part 29 is exemplified by an annulus while the second coupling part 21 is exemplified by a hook 22. However these coupling parts can take other forms that enable mutual engagement and facilitate an articulated coupling to the support. For example one or both of the first and second coupling parts may be in the form of a carabiner clip or snap hook that can be selectively opened and closed.

Various operations of embodiments are provided herein. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, "exemplary" is used herein to mean serving as an example, instance, illustration, etc., and not necessarily as advantageous. As used in this application, "or" is intended to mean an inclusive "or" rather than an exclusive "or", unless specified otherwise, or clear from context. In addition, "a" and "an" as used in this application and the appended claims may generally be construed to mean "one or more" unless specified otherwise or clear from context to be directed to a singular form. Also, at least one of A and B or the like generally means A or B or both A and B.

Although the disclosure has been shown and described with respect to one or more implementations, equivalent alterations and modifications will occur to others skilled in the art based at least in part upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that "includes", "having", "has", "with", or variants thereof are used in either the detailed description or the claims, such terms are intended to be inclusive in a manner similar to the term "comprising."

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B, where channel A and channel B are two different channels, two identical channels or the same channel.

What is claimed is:

1. A cable suspension comprising:
   a body configured to receive a cable and comprising:
   a first shell; and
   a second shell comprising a connection plate, wherein the connection plate defines a hole extending in a first direction through which a mechanical fastener is inserted to couple the second shell to the first shell; and
   a bracket pivotally coupled to the body about a pivot axis and arranged to couple to a support at a location above the pivot axis extending in a second direction different than the first direction, wherein the pivot axis is orientated to pass through a thickness of a cable received in the body.

2. The cable suspension of claim 1, wherein the second direction is perpendicular to the first direction.

3. The cable suspension of claim 1, wherein the first shell and the second shell together define a channel extending in a third direction different than the first direction and the second direction.

4. The cable suspension of claim 3, wherein:
   the third direction is perpendicular to the first direction,
   the second direction is perpendicular to the first direction, and
   the third direction is perpendicular to the second direction.

5. The cable suspension of claim 1, wherein the bracket comprises:
   a cradle comprising a first arm, a second arm, and a bridge coupling the first arm to the second arm.

6. The cable suspension of claim 5, wherein the first shell defines a hole extending in the first direction through which the mechanical fastener is inserted to couple the second shell to the first shell.

7. The cable suspension of claim 6, wherein the hole is defined in a first surface of the first shell and a second surface of the first shell, diametrically opposite the first surface of the first shell, faces the bridge.

8. The cable suspension of claim 1, wherein the bracket defines an annulus for attaching the bracket to a mounting interface, wherein the annulus extends in the second direction from a first surface of the bracket to a second surface of the bracket diametrically opposite the first surface.

9. The cable suspension of claim 1, wherein:
   the second shell and the first shell together define a channel,
   the channel comprises an intermediate portion disposed between a first end portion and a second end portion,
   the intermediate portion has a first diameter, and
   the first end portion has a second diameter different than the first diameter.

10. The cable suspension of claim 9, wherein the second diameter is greater than the first diameter.

11. The cable suspension of claim 1, wherein the first shell comprises a central portion having a planar top surface facing the connection plate of the second shell.

12. The cable suspension of claim 11, wherein the central portion comprises a sidewall abutting the planar top surface and having a blind hole defined therein for coupling the first shell to the bracket.

13. The cable suspension of claim 12, wherein the blind holes having a conical toe.

14. A cable suspension comprising:
 a body configured to receive a cable and comprising:
  a first shell; and
  a second shell selectively detachable from the first shell; and
 a bracket pivotally coupled to the body about a first pivot axis and arranged to couple to a support at a location above the first pivot axis, wherein the bracket comprises:
  a first arm;
  a second arm; and
  a bridge coupling the first arm to the second arm, wherein the first arm is pivotally coupled to the bridge about a second pivot axis.

15. The cable suspension of claim 14, wherein the second pivot axis is perpendicular to the first pivot axis.

16. The cable suspension of claim 14, wherein the second arm is integrally coupled to the bridge.

17. The cable suspension of claim 14, the bracket comprising:
 a hinge pin extending through a hole defined by the first arm and a hole defined by the bridge to couple the first arm to the bridge.

18. The cable suspension of claim 14, wherein:
 the second shell comprises a connection plate,
 a first surface of the connection plate faces the first shell, and
 a second surface of the connection plate, diametrically opposite the first surface, faces the bridge.

19. The cable suspension of claim 14, wherein the first shell defines a blind hole for coupling the first shell to the bracket.

20. A cable suspension comprising:
 a body configured to receive a cable and comprising:
  a first shell; and
  a second shell; and
 a bracket pivotally coupled to the body about a pivot axis and arranged to couple to a support at a location above the pivot axis, wherein the bracket is coupled to the first shell and surrounds the second shell.

* * * * *